United States Patent Office 3,447,622
Patented June 3, 1969

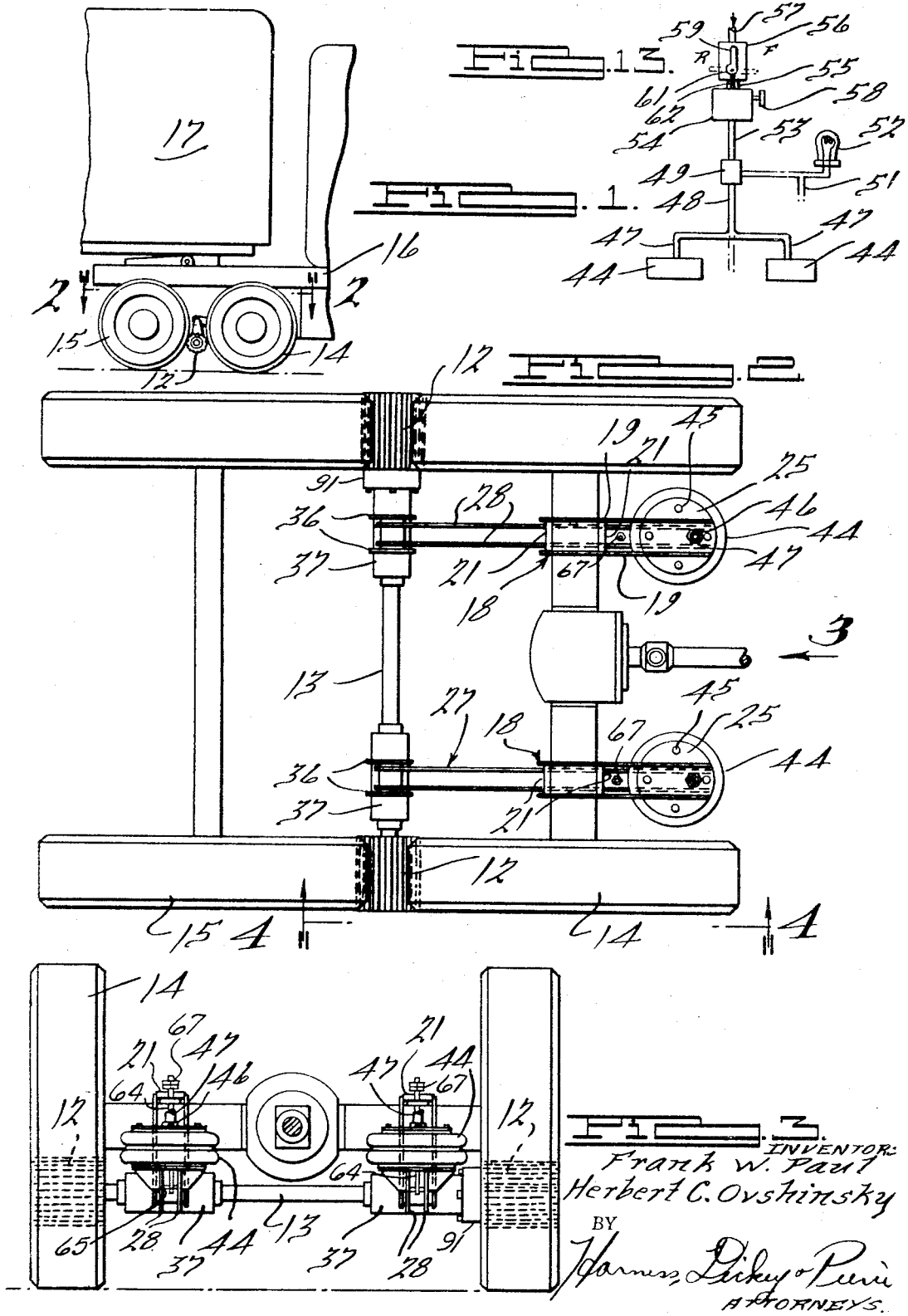

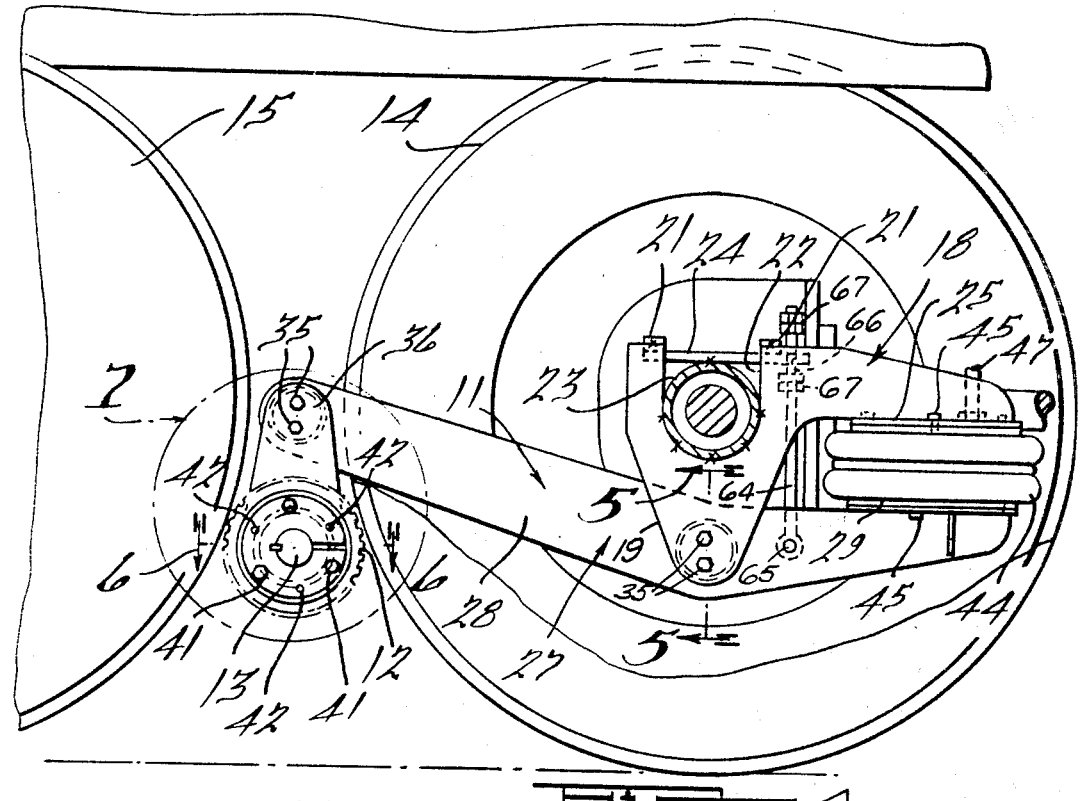
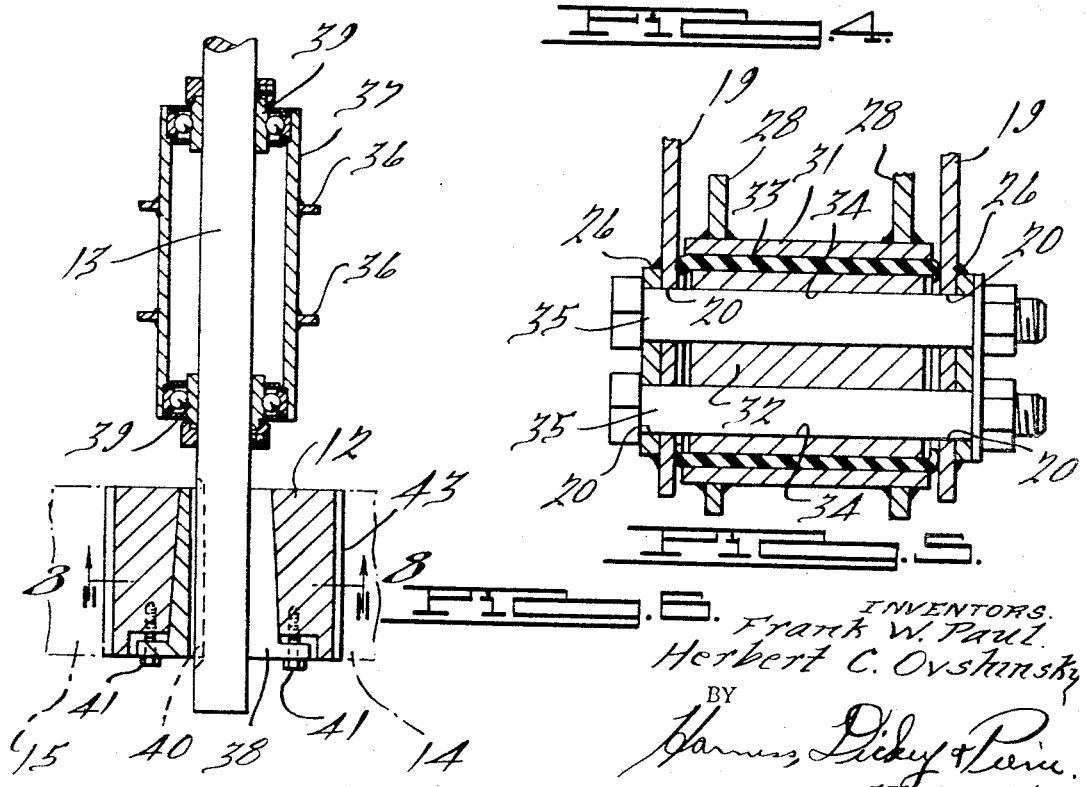

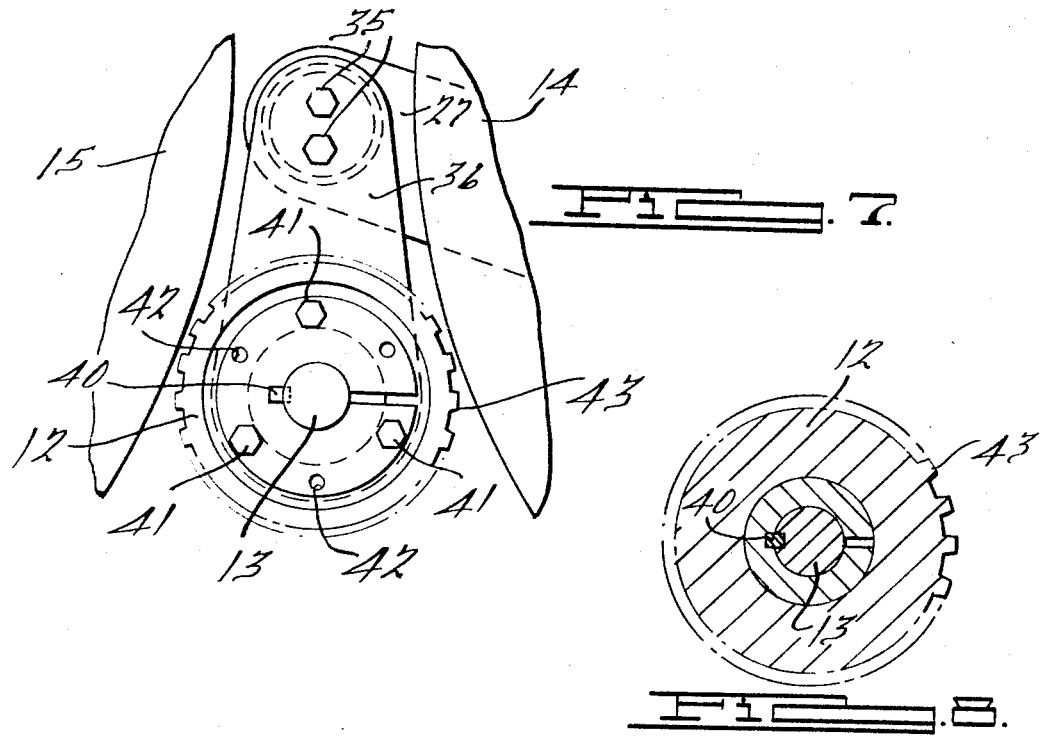
FIG. 7.
FIG. 8.
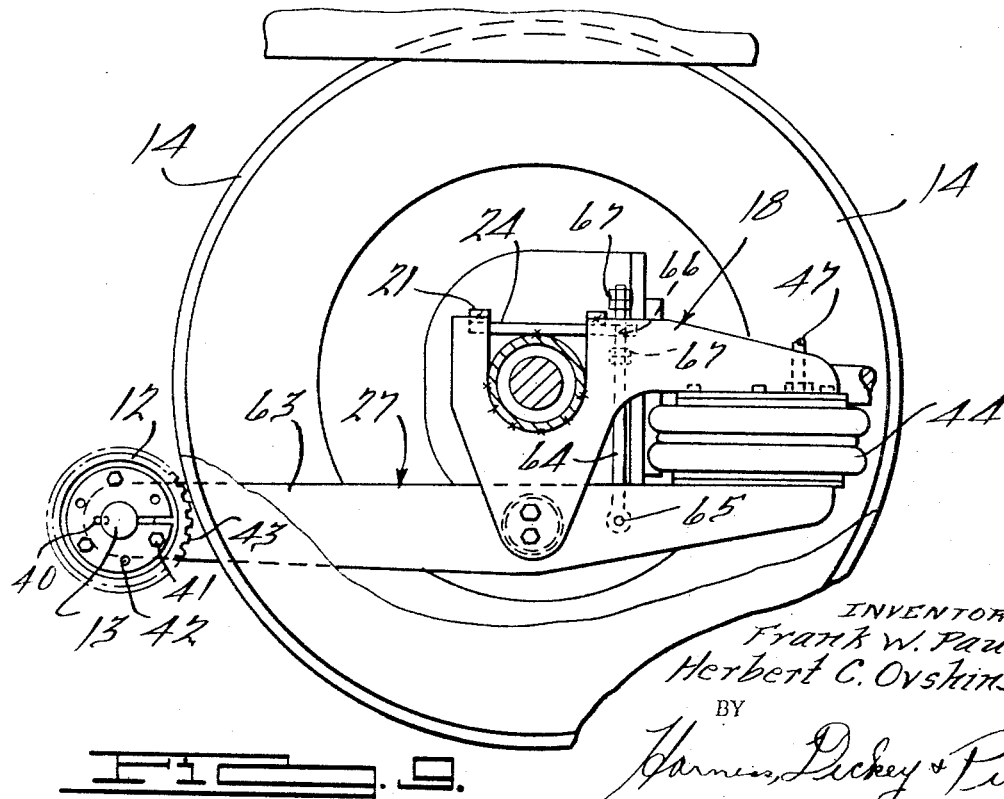
FIG. 9.
INVENTORS.
Frank W. Paul
Herbert C. Ovshinsky
BY
Harness, Dickey & Pierce
ATTORNEYS

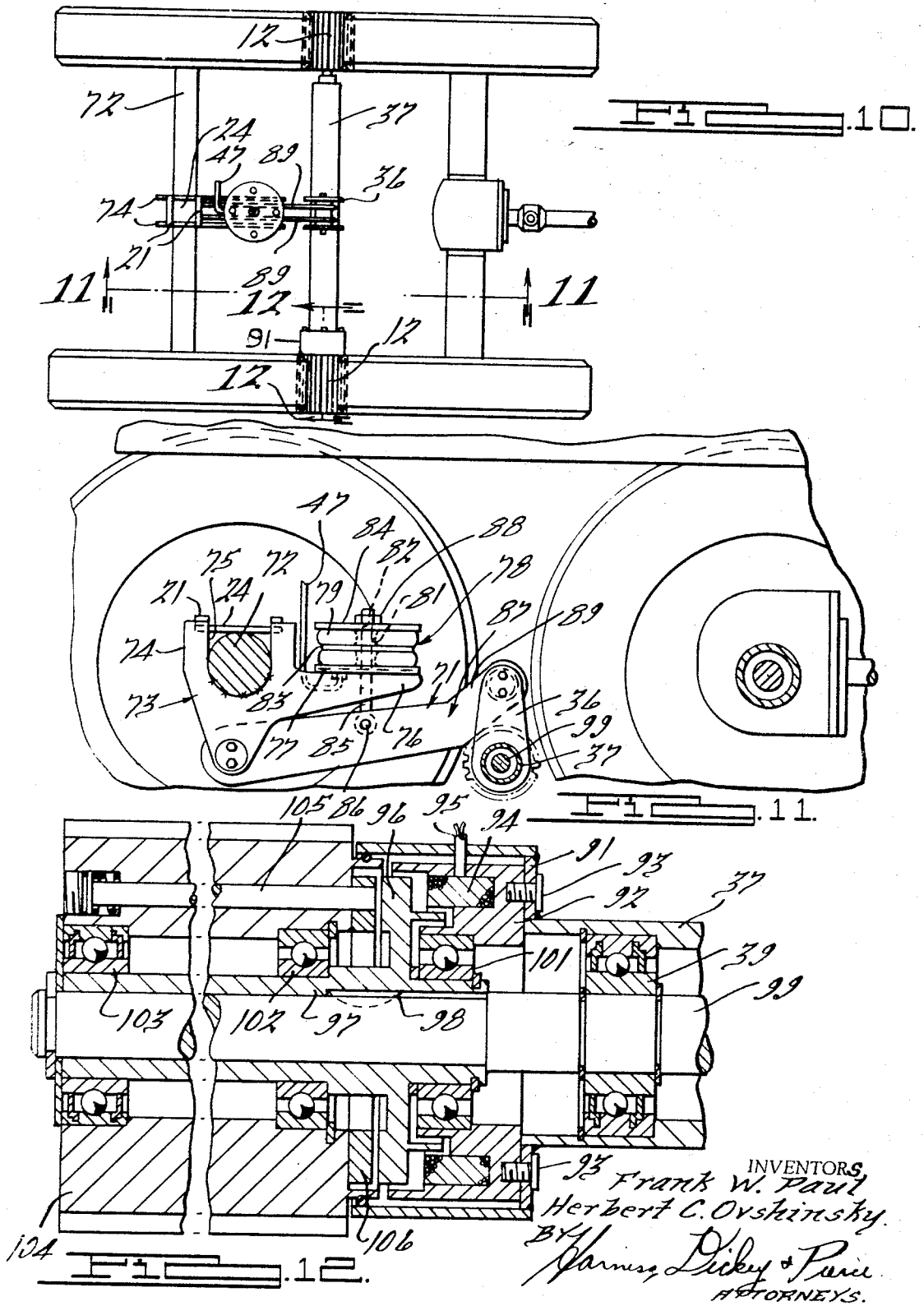

3,447,622
COUPLING DEVICE FOR VEHICLE DRIVE WHEELS
Herbert C Ovshinsky, 15200 Leslie, Oak Park, Mich. 48237, and Frank W. Paul, Rte. 2, Gainesville, Ga. 30501
Filed Feb. 13, 1967, Ser. No. 615,714
Int. Cl. B62d 61/10; B60k 17/16
U.S. Cl. 180—22       10 Claims

ABSTRACT OF THE DISCLOSURE

The device is a locking differential for driving both wheels in unison and can be used for driving the wheels of a static axle when dual wheels are employed.

---

The disclosure pertains to the use of the mechanism for moving a pair of auxiliary wheels fixed to a cross shaft into engagement with the driving tires of a vehicle to have the wheels operate in unison so that one cannot spin relative to the other and when dual wheels are employed for engaging and positively driving the dual wheels by the auxiliary wheels. Force exerting elements are employed for moving the cross shaft and auxiliary wheels upwardly between the dual tires on each side of the vehicle for producing the synchronized drive between the wheels.

BACKGROUND OF THE INVENTION

The invention is in the fields of locking differentials which are effective when one wheel attempts to spin relative to the other to temporarily lock the differential so that both wheels must drive at the same speed. By using the cross shaft with the auxiliary wheels on the ends aligned with the driving tires, the movement of the auxiliary wheels into engagement with the tires will lock the wheels to operate in synchronism so that one cannot spin relative to the other. In this phase of the invention, the use of the device produces the same result as the locking differential. The additional advantage of the present device is that of providing a drive for tandem wheels when the cross shaft is moved upwardly between the driving and the tandem wheel tires to force the auxiliary wheels in driving engagement therewith.

PRIOR ART

From a patent search, auxiliary wheels on a cross shaft were disclosed for engaging tires on the drive wheels of vehicles. In studying this art, it was found that the device for moving the axle and wheel was mounted on the sprung chassis frame and not on the unsprung portion of the vehicle. Since the height of the sprung portion of the vehicle relative to the unsprung portion thereof varies substantially with the load the effectiveness of the device changed with the load and was not reliable.

SUMMARY OF THE INVENTION

The present invention pertains to one or a pair of brackets secured to the fixed tandem axle or to the housing of the driven axle between the wheels with a lever pivoted on the bottom of the brackets. Force applying means such as bellows are provided between the bracket and one end of the lever for rocking the lever in a vertical plane. The opposite end of the lever has a link extending downwardly for supporting a cross shaft for rotation. The ends of the shaft have auxiliary wheels fixed thereto and disposed in alignment with the wheels and of a width to engage the entire face of the tires when forced into engagement therewith. The cross shaft and auxiliary wheels are suspended between the aligned two tries of the dual wheels at each side of the tractor and when pulled upwardly by the expansion of the bellows, the auxiliary wheels will be forced against the surface of the tires and a uniform drive of all four wheels will result. In another form of the invention, when a single pair of drive wheels are employed the cross shaft and the auxiliary wheels are directly pivoted to the end of the single or pair of levers opposite to that engaged by the bellows so that when the levers are rocked upwardly the auxiliary wheels will be moved into engagement with the tires and the wheels will be forced to operate in unison. A clutch may be employed adjacent to one of the auxiliary wheels so that a drive for the tandem wheels can be provided without locking the differential.

BRIEF DESCRIPTION OF THE DRAWINGS

FIGURE 1 is a broken view in elevation of a tractor-truck combination with the device of the present invention supported on the tractor axle housing;

FIG. 2 is a broken sectional view of the structure illustrated in FIG. 1, taken on the line 2—2 thereof;

FIG. 3 is an end view of the structure illustrated in FIG. 2, as viewed from the point 3 thereof;

FIG. 4 is an enlarged broken view of the structure illustrated in FIG. 2, as viewed from the line 4—4 thereof;

FIG. 5 is an enlarged broken sectional view of the structure illustrated in FIG. 4, taken on the line 5—5 thereof;

FIG. 6 is an enlarged broken sectional view of the structure illustrated in FIG. 4, taken on the line 6—6 thereof;

FIG. 7 is an enlarged broken view of the structure illustrated in FIG. 4, as viewed within the circle 7 thereof;

FIG. 8 is an enlarged sectional view of the structure illustrated in FIG. 6, taken on the line 8—8 thereof;

FIG. 9 is a view of structure, similar to that illustrated in FIG. 4, showing another form of the invention;

FIG. 10 is a view of structure, similar to that illustrated in FIG. 2, showing a further form of the invention;

FIG. 11 is an enlarged broken sectional view of the structure illustrated in FIG. 10, taken on the line 11—11 thereof;

FIG. 12 is an enlarged broken sectional view of the structure illustrated in FIG. 10, taken on the line 12—12 thereof, and FIG. 13 is a schematic view of a fluid control system employed with force applying means of the present invention.

DESCRIPTION OF THE PREFERRED EMBODIMENTS

Referring to FIGS. 1 to 8, the device of the present invention pertains to a coupling device 11 secured to the unsprung portion of a vehicle. Auxiliary wheels 12 of the device are fixed to the ends of a cross shaft 13 and are forced into engagement with the faces of tires 14 and 15 on the driven and static axles of the vehicle herein illustrated as a tractor 16 coupled to a trailer 17. A pair of brackets 18 are made from two plates 19 which are spaced apart by bars 21. The plates 19 have a slot 22 extending downwardly from the top which receives the axle housing 23 to which it is initially supported by a plate 24 which extends beneath the bars 21. After the plates 19 of the brackets are leveled and disposed in parallel relation they are then welded to the bottom portion of the axle housing. A plate 25 is welded at the ends of the horizontal portion of the plates 19. The downwardly extending portion of the brackets has circular plates 26 welded thereto and provided with a pair of apertures 20 which extend through the plates 19.

A lever 27 for each bracket is made from two plates 28 which has a circular plate 29 the size of the plate 25 welded to one end in alignment with the plate 25 when the levers are secured on the brackets 18. At the opposite end of the lever and at a point between the ends, a sleeve 31 extends through apertures in the plates 28 and are welded thereto. A cylindrical bushing 32 has a thick rubber sleeve 33 adhered thereto and forced within the sleeve 31 to provide friction which prevents movement of the bushing with the surface of the sleeve. The bushings have a pair of apertures 34 which align with the apertures 20 for receiving a pair of bolts 35. When the intermediate bushings are secured to the plates 19, any movement between the bracket 18 and lever 27 occurs in the material of the rubber sleeves 33. In this manner the levers 27 are rockably supported on the downwardly extending portion of the brackets 18.

A pair of links 36 having a pair of apertures 20 in the upper end are secured by the bolts 35 to the cylindrical bushing 32 at the end of the levers 27. The lower end of the links 36 have apertures therethrough through which a sleeve 37 extends to be fixed thereto as by welding. The sleeves 37 support a pair of sealed bearings 39 at the ends so that four bearings, two on each lever 27, are provided for supporting the cross shaft 13.

A split tapered collar 38 of conventional form is secured to the ends of the shaft by a key 40 to rotate therewith. The auxiliary wheels 12 have a central tapered opening for mating with the taper of the collars 38 and are drawn into driving engagement therewith by a plurality of screws 41. Threaded apertures 42 are provided in the flange at the end of the collars 38 into which the bolts 41 may be threaded for pushing the auxiliary wheels 12 from the collars. While both auxiliary wheels may be secured in this manner, one of the wheels is herein illustrated as having a clutch within the housing 91 applied thereto, the construction of which will be described in detail hereinafter. The periphery of the wheels 12 has lands and grooves 43 to provide positive traction with the faces of the tires 14 and 15. An expandable bellows 44 of conventional form is secured by screws 45 to the circular plates 25 and 29 to be supported therebetween. The plates 25 have an aperture 46 therethrough through which a conduit 47 passes.

The conduits 47, as illustrated in FIG. 13, from both of the bellows 44 are interconnected by a T from which conduit 48 is joined to a pressure switch 49 from which conductors 51 are connected to a lamp 52 or other signaling device. A conduit 53 from the pressure switch 49 is joined to a pressure regulator valve 54. The pressure regulator valve is joined by conduit 55 to a manually operated valve 56 which is connected by conduit 57 to an air or other fluid pressure supply. It was found that when going forwardly that the auxiliary wheels 12 were drawn upwardly by the driving wheels and require less pressure to be supplied to the bellows 44 than when going backwardly when the driving wheels are tending to move the auxiliary wheels downwardly. Due to this difference in the required pressures, the pressure valve 54 has the adjusting needle 58 set to provide the amount of pressure required to drive the tandem wheels 15 from the driven wheels 14 when moving forwardly. In this arrangement the valve handle 59 will be moved clockwise to the dot dash position at the right of the center of the valve 56. When the drive is to the rear, the handle 59 will be moved counterclockwise to the left at which time a cam 61 at the bottom of the handle will move a rod 62 downwardly to shift the valve seat of the regulator valve 54 to increase the pressure through the regulating valve 54 to the bellows 44 sufficiently to overcome the tendency of moving the auxiliary wheels 12 downwardly.

In operation, when no fluid pressure is supplied to the bellows 44, as in FIG. 4, the auxiliary wheels 12 will extend downwardly out of engagement with the tires 14 and 15. When more traction is desired or when slippage may occur, air or other pressure fluid is introduced into the bellows 44 to raise the cross shaft 13 and force the auxiliary wheels 12 into engagement with the adjacent faces of the tires 14 and 15. The pressure of this engagement is controlled by the regulator valve 54 so as not to harm the tires while providing a positive driving force therebetween. The tires 14 will drive the tires 15 through the auxiliary wheels 12 and the auxiliary wheels will prevent either one of the tires 14 from spinning relative to the other.

In FIG. 9, a similar form of construction is illustrated that wherein levers 63 are substantially horizontal and in place of the sleeves 31 at the lever ends, the sleeves 37 with the bearing 39 and cross shaft 13 therein, are mounted thereon. The auxiliary wheels 12 are out of engagement with the tires 14 when the bellows 44 have no pressure therein as illustrated in the figure. When pressure is applied to the levers 63 where the pressure fluid is admitted to the bellows 44, the levers will rock clockwise and thereby bring the auxiliary wheels 12 into engagement with the face of the tires 14 and lock the wheels to prevent any differentiation occurring therebetween. In this arrangement the auxiliary wheels 12 act only as a differential lock to prevent one wheel from spinning relative to the other. This lockup will immediately occur when the valve handle is moved to either of the "On" positions to supply fluid to the bellows 44 when moving forwardly or rearwardly.

An eye bolt 64 is secured to the lever 63 in FIG. 9 and to the lever 28 in FIG. 4 by a pivot pin 65 and extends upwardly through an aperture 66 in the extension of the plate 24. Nuts 67 threaded on the bolt on opposite side of the plate limit the amount of movement of the levers 28 and 63, the extension or compression strains on the bellows 44 and the movement of the cross shaft 13.

In FIGS. 10, 11 and 12, a still further form of the invention is illustrated that wherein a coupling device 71 is mounted on a nonrotatable tandem axle 72. It is to be understood that such a device can be employed upon the axle housing of the driven axle or that the foregoing devices of FIGS. 1 to 8, can be applied to the fixed axle 72. A bracket 73 is made from a pair of plates 74 having a cutout portion 75 which receive the fixed axle 72. Bars 21 are secured to the tops of the plates 74 to be engaged by a plate 24 for locating the bracket on the shaft in a manner as pointed out hereinabove. The plates 74 have extending arms 76 to which the bottom plate 77 of a bellows 78 is welded or otherwise secured. The elastomeric elements 79 of the bellows are doughnut shaped having a central opening 81 which are aligned with apertures 82 in a bottom plate 77, the intermediate plate 83 and the top plate 84 to which the elastomeric elements are bonded. An eye bolt 85 is secured by a pivot pin 86 to the lever 87 and extends through the central apertures 82 of the bellows and retained in position by a nut 88. It is to be understood that a bellows similar to the one employed in FIGS. 1 to 9 could be utilized but in such an arrangement a U-shaped yoke would be provided and secured to the top plate 84 with the downwardly extending arms engaged by the pivot pin 86. The lever 87 is made from a pair of plates 89 which are attached to the bracket 73 at one end and to the pair of links 36 at the other end. The links 36 have apertures at the lower end through which a sleeve 37 extends to be fixed thereto as by welding. The sleeve 37 is of substantial length and supports a pair of sealed bearings at the ends so as to be located adjacent to the auxiliary wheels 12. The connections between the plates 89 and the links 36 and the plates 74 of the bracket 73 are made by the use of the bushings 32 and bolts 35 in the manner as illustrated in FIG. 5. This connection prevents the free pivotal movements at the joints and stabilizes the assembly while permitting relative movement therebetween when pressure is applied to the bellows or removed therefrom so that they return to their initial position with the auxiliary wheels 12 out of contact with the tires.

When a fluid is admitted to the bellows 78 in the manner as pointed out hereinabove with regard to the structure of FIGS. 1 to 8, the top plate 84 of the bellows will move upwardly away from the fixed bottom plate 77 moving the eye bolt 85 upwardly to thereby swing the lever 87 upwardly to raise the links 36 and move the auxiliary wheels 12 into engagement with the tires 14 and 15 in the manner and for the purpose pointed out hereinabove.

Where a great amount of close coupled turning occurs, it is desirable to have the wheels differentiate. For this purpose a clutch housing 91 is provided on one end of the sleeve 37 to which a fixed clutch portion 92 is secured by screws 93. The clutch is of the magnetic type having a coil 94 secured in the fixed portion 92 and supplied by current from a pair of conductors 95. A magnet field is provided to a flange 96 on a sleeve 97 which is secured by a key 98 to the cross shaft 99. A bearing 101 is disposed between the fixed clutch portion 92 and the sleeve 97 and a bearing 102 and a sealed bearing 103 on the sleeve 97 supports an auxiliary wheel 104. The wheel carries a plurality of spring pressed pins 105 secured to a face plate 106 which is drawn into engagement with the flange 96 when the coil 94 is energized to produce a positive drive to the auxiliary wheel through the pins 105. By energizing and deenergizing the coil the auxiliary wheel 104 can be fixed to the cross shaft 99 or released therefrom. With this arrangement the differential can be locked or permitted to operate to meet a particular driving condition. While the auxiliary wheels are herein illustrated as being made of metal, a rim of rubber or rubberlike material of the consistency of the tire of the wheels, or slightly softer or harder, can be provided to protect the tire surfaces from being cut or torn by the metal of the auxiliary wheels. In the structure of FIGS. 10, 11 and 12 the wheel 104 can be made entirely of the rubberlike material. It is to be understood that when pressure fluid is mentioned that a vacuum is included.

What is claimed is:

1. In an engaging device for the tires of differentially driven axle supported wheels transversely aligned at opposite sides of a vehicle having sprung and unsprung portions, said differentially driven wheels including said axle constituting the unsprung portion, bracket means secured to said unsprung portion of the vehicle, lever means secured to said bracket means for vertical swinging movement, force exerting means between said bracket means and one end of said lever means, a cross shaft rotatably supported by the other end of said lever means, and at least one auxiliary wheel fixedly supported on each end of said cross shaft and rotatable therewith and movable simultaneously into driving engagement with the peripheral faces of the tires at opposite sides of the vehicle to prevent the differential action of said wheels.

2. In an engaging device as recited in claim 1, wherein peripheral friction faces are provided on the auxiliary wheels which prevents slippage with the tires and provides traction engagement between the tires at opposite sides of the vehicle.

3. In an engaging device as recited in claim 1, wherein the cross shaft is supported by link means, and resilient means are provided for securing said link means to the end of the lever means.

4. In an engaging device as recited in claim 1, wherein the lever means and the bracket means are secured together by an elastomeric bushing which permits the movement of the lever means in a vertical plane.

5. In an engaging device as recited in claim 1, wherein the force-applying means between the lever means and the bracket means is a bellows.

6. In an engaging device as recited in claim 5, wherein limiting means are provided for controlling the degree of movement of said lever means and the expansion of said bellows.

7. In an engaging device as recited in claim 1, wherein a pair of bracket means, lever means and force applying means are employed in the device for pivotally supporting said cross shaft adjacent to said auxiliary wheels.

8. In an engaging device as recited in claim 1, wherein a clutch is provided between one of the auxiliary wheels and the cross shaft.

9. In an engaging device for the tires of a pair of differentially driven wheels of a vehicle having sprung and unsprung portions, the unsprung portion including supporting means for said wheels, a bracket supported on said supporting means for said wheels, a lever supported by said bracket for vertical swinging movement, force exerting means secured between the bracket and one end of the lever, a cross shaft rotatably supported at the other end of the lever, and an auxiliary wheel fixed to each end of and rotatable with said cross shaft for simultaneous movement into engagement with the driven tires to cause them to drive at the same speed.

10. In an engaging device as recited in claim 9, wherein tandem wheels are provided adjacent to said driven wheels, and wherein the cross shaft is mounted on link means pivoted to said end of the lever in position to have the auxiliary wheels engage the driven tires and the tires of said tandem wheels with substantially equal force.

References Cited

UNITED STATES PATENTS

| | | | |
|---|---|---|---|
| 2,852,101 | 9/1958 | Rappaport | 180—74 X |
| 2,861,643 | 11/1958 | Wald et al. | 180—74 |
| 2,894,592 | 7/1959 | Ordorka | 280—124 X |
| 3,179,400 | 4/1965 | Krotz | 280—124 X |
| 3,197,237 | 7/1965 | Smith | 180—22 X |
| 3,275,091 | 9/1966 | Steck et al. | 180—22 |
| 3,347,332 | 10/1967 | Thompson | 180—22 |

A. HARRY LEVY, *Primary Examiner.*

U.S. Cl. X.R.
74—710.5; 180—74, 75; 192—48.2